(12) United States Patent  
Wernicke (10) Patent No.: US 9,057,776 B1  
(45) Date of Patent: Jun. 16, 2015

(54) HYBRID ESTIMATION DF ALGORITHM

(75) Inventor: Kent A. Wernicke, Grapevine, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 584 days.

(21) Appl. No.: 13/523,474

(22) Filed: Jun. 14, 2012

(51) Int. Cl.
*G01S 5/02* (2010.01)
*G01S 3/48* (2006.01)
*G01S 3/46* (2006.01)
G01S 5/04 (2006.01)

(52) U.S. Cl.
CPC ... *G01S 3/48* (2013.01); *G01S 3/46* (2013.01); *G01S 5/04* (2013.01)

(58) Field of Classification Search
CPC .............. G01S 3/48; G01S 3/46; G01S 5/04
USPC ........................................................ 342/424
See application file for complete search history.

(56) References Cited

U.S. PATENT DOCUMENTS

| | | | | |
|---|---|---|---|---|
| 5,457,466 A | * | 10/1995 | Rose | 342/442 |
| 5,592,180 A | * | 1/1997 | Yokev et al. | 342/450 |
| 2007/0273576 A1 | * | 11/2007 | Struckman et al. | 342/156 |
| 2010/0033378 A1 | * | 2/2010 | Straatveit et al. | 342/378 |

* cited by examiner

Primary Examiner — Frank J McGue
(74) Attorney, Agent, or Firm — Angel N. Gerdzhikov; Donna P. Suchy; Daniel M. Barbieri (57) ABSTRACT

A hybrid method and system is disclosed for determining a direction finding (DF) to a received radio frequency (RF) signal. The method employs a linear interferometer array to receive and measure electrical phase differences in a received RF signal. A closed form analysis of the phase differences produces a first integer solution to which the method adds a plurality of offset values to produce a corresponding plurality of offset integer solutions. The number of offset values is proportional to the length of the baseline of the antenna array. These offset integer solutions are evaluated based on their deviation from measured phase differences by the array. Of the first integer solution and the offset integer solutions, one solution is selected based on a minimum deviation from the measured phase differences. The selected solution is output to a higher level processor and further displayed to an operator as the correct DF solution.

20 Claims, 6 Drawing Sheets

| | |
|---|---|
| 502 | receiving, via a linear interferometer array, an RF signal |
| 504 | receiving, from said linear interferometer array, at least two differences in electrical phase of said RF signal between at least three antenna elements of said linear interferometer array |
| 506 | determining, via a closed form algorithm, a first integer solution based on said at least two differences in electrical phase |
| 508 | determining, a plurality of adjacent integer solutions based at least in part on said first integer solution, each of said plurality of adjacent integer solutions having in common at least one variable |
| 510 | determining a plurality of extended phase solutions based on one of said plurality of adjacent integer solutions and said at least two differences in electrical phase |
| 512 | scaling said plurality of extended phase solutions based on a frequency of said RF signal, said scaling resulting in a plurality of scaled solutions |
| 514 | determining a plurality of deviations associated with each of said plurality of scaled solutions from at least one of said at least two differences in electrical phase |
| 516 | determining a minimum deviation from said plurality of deviations associated with each of said plurality of scaled solutions |
| 518 | selecting one of said plurality of scaled solutions with said minimum deviation as an output DF |
| 520 | configuring and transmitting said output DF to an analysis and control processor |
| 522 | displaying said output DF to an operator on a display |

- 602 storing non-transitory computer readable program code embodied within a computer readable medium for determining a direction finding (DF) to a received radio frequency (RF) signal, the non-transitory computer readable code comprising instructions which, when executed by a processor, performs the steps of:

- 604 receiving, via a linear interferometer array, an RF signal

- 606 receiving, from said linear interferometer array, at least two differences in electrical phase of said RF signal between at least three antenna elements of said linear interferometer array

- 608 determining, via a closed form algorithm, a first integer solution based on said at least two differences in electrical phase

- 610 determining, a plurality of adjacent integer solutions based at least in part on said first integer solution, each of said plurality of adjacent integer solutions having in common at least one variable

- 612 determining a plurality of extended phase solutions based on one of said plurality of adjacent integer solutions and said at least two differences in electrical phase

- 614 scaling said plurality of extended phase solutions based on a frequency of said RF signal, said scaling resulting in a plurality of scaled solutions

- 616 determining a plurality of deviations associated with each of said plurality of scaled solutions from at least one of said at least two differences in electrical phase

- 618 determining a minimum deviation from said plurality of deviations associated with each of said plurality of scaled solutions

- 620 selecting one of said plurality of scaled solutions with said minimum deviation as an output DF

- 622 configuring and transmitting said output DF to an analysis and control processor

- 624 displaying said output DF to an operator on a display

FIG. 6

HYBRID ESTIMATION DF ALGORITHM

FIELD OF THE INVENTION

The present invention relates generally to direction finding (DF) of an incoming Radio Frequency (RF) signal. More particularly, embodiments of the present invention relate to a computerized hybrid method of comparing estimation techniques to calculations based on received measurements to determine an accurate bearing of an incoming RF signal.

BACKGROUND OF THE INVENTION

A Linear interferometer direction finding (DF) antenna array may be utilized for 1) reception of Radio Frequency (RF) signals from an emitter, and 2) for determining the bearing to the signal based on an analysis of a phase shift between the signals received by the separate antennas comprising the array. For example, signals transmitted from a radar emitter or communication emitter may propagate in a plurality of directions. Each antenna of a linear interferometer array may receive the signal in order to determine from which direction the signal is being emitted relative to the receiving antenna array. A standard class of algorithm may then be used to receive an input from the array to calculate a bearing from receiver to the emitter. The standard algorithm may use well known techniques to achieve the bearing.

A Linear Interferometer may comprise multiple antennas positioned to provide multiple antenna-to-antenna baselines for measuring differences in electrical phase of an arriving RF signal. The length of the baselines, herein referred to as the spacing, may be the basis for a plurality of calculations made by the standard algorithm. In a conventional precision linear interferometer, each of these baselines may be significantly longer than the $½λ$ (lambda). Herein $λ$ may be defined as the wavelength of the antenna array's highest operating frequency.

A $½λ$ antenna spacing may provide a one-to-one mapping of arrival angle across +/−90 mechanical degrees to +/−90 degrees of electrical phase measurements. With longer antenna spacing, (greater than $½λ$) the +/−90 mechanical degrees map to more than +/−90 electrical degrees and cannot be unambiguously resolved. For example, ambiguity may arise where multiple arrival angles result in the same electrical phase measurement as an algorithm may rely on the phase measurement as an input variable to the DF determination. In precision DF arrays, multiple elements (3 or more) may be arranged to provide multiple baselines (2 or more) such that each arrival angle may map to a unique combination of the multiple phase measurements.

Using multiple baselines may allow use of much longer antenna spacing than $½λ$. Current precision interferometers may use a standard spacing from 10 to $25λ$ or more. Additionally, considerably longer antenna spacing of greater than $60λ$ has been investigated and determined to provide accurate DF measurements. One advantage of a longer baseline may include improved DF accuracy. The improvement in DF accuracy may be directly proportional to the increase in the antenna baseline. For example, a baseline length $20λ$ may provide a 40 fold increase in accuracy over what could be achieved with a $½λ$ spacing. Multiple antenna linear interferometer arrays working in unison may provide for even greater DF accuracy. However, implementation of such longer spacing and multiple arrays may present a challenge.

These longer baselines and multiple arrays, however, present a current challenge of allowable space on an airframe or platform to which the antenna array may be mounted. An aircraft designer may not have available the required physical distance to generate the accuracy provided by such longer baselines.

Additionally, various methods of determining a DF solution based on measured phase values may result in the generation of ambiguous DF solutions, or invalid DF solutions, at low signal to noise ratios.

A closed form method of analysis of measured values may be currently in use in a variety of systems. This closed form method may be implemented in real time systems in a variety of ways. Early implementations used ROM look-up tables incorporated in the algorithm. Current implementations may utilize Field Programmable Gate Arrays (FPGAs) to implement the algorithm in a manner very close to the way it may be written in algebraic form. Both implementations may be used to calculate DF solutions to a high level of accuracy within a few hundred nanoseconds. Calculation speed may of considerable importance for real time systems that intercept and process millions of signals per second. One advantage of the FPGA approach may include flexibility and reduced development time. This closed form approach may also have been implemented in software. Software implementations however, may be limited to systems that calculate DF on only a small subset of intercepted signals.

One drawback of the closed form approach may be encountered when a significant amount of error is included in the phase measurements due to low signal to noise ratio (SNR). With a certain amount of error, the closed form algorithm may calculate the wrong integer and may generate the wrong DF solution. This type of DF error may be referred to as ambiguity. Closed form algorithms may be structured so that the possibility of such ambiguity may be indicated. However, when such an ambiguity condition exists, the closed form algorithm provides no alternate solution. The result of such an error may be of two types: 1) where a valid but wrong DF angle is generated, and 2) be the generation of a numerical solution that does not map to a valid DF angle.

A simple estimation method has also found limited real time success in the past. The simple estimation method may function by evaluating all possible solutions that could result from one of the phase measurements. The phase measurement from the long baseline may be used as the basis for the estimation. For each of the possible DF solutions, the other phase measurements are estimated and compared to the actual measured phase values. The root mean square (RMS) of the difference may be calculated and compared for all the possible solutions. The solution with the smallest RMS distance between the estimated and measured phase values may be selected as the DF solution.

One advantage of the simple estimation method over the closed form method may result when there are possible numerical solutions calculated by the closed form method that do not generate valid DF solutions. These solutions would be discarded by the estimation method with the selection of the accurate DF solution being from the possibilities that provide valid DF solutions. This case may exists where the DF array may receive and attempt to process a signal of at a frequency below the maximum unambiguous frequency range of the array. The number of valid solutions in proportion to total solutions may be approximately equal to the ratio of maximum frequency to intercept frequency. For example, in an array with an unambiguous frequency range of 2-18 GHz (a standard frequency range of radar emitters), with a maximum frequency of 18 GHz, the array may produce a number of solutions 50% of which are valid at 9 GHz and 11% of which are valid at 2 GHz. At lower frequencies near 2 GHz, the estimation method may generate a more accurate DF solution at a lower SNR than would the closed form method.

One primary drawback of the simple estimation method may be the number of mathematical operations required and the resources required to accomplish the operations. For a standard $n\lambda$ spacing 2n possible DF solutions may exist for each phase value of the long baseline pair. Five multiply operations, in addition to several other more simple operations, are required for each evaluation. Thus, for each possible solution, over 10n multiply operations as well as several other operations would be required. Next, a comparison of all 2n solutions is required to determine the best fit DF solution. An FPGA implementation of the estimation method would require extensive and costly component resources.

For each $1\lambda$ increase in spacing, an increase of 10 multiply operations is required. Much greater spacing of the antennas may be considered, however, current FPGA resources required and timing constraints would discourage implementation of such an algorithm for such an increase in spacing.

Therefore, a novel hybrid approach may be necessary to accurately calculate a DF angle at low SNRs from the electrical phase measurements taken by a linear interferometer with any baseline. This hybrid approach may comprise portions of the closed form techniques combined with estimation techniques to determine a very accurate DF solution from any RF frequency signal at all SNR with limited computational resources required.

SUMMARY OF THE INVENTION

Accordingly, an embodiment of the present invention is directed to a method for determining a direction finding (DF) to a received radio frequency (RF) signal, the method comprising: receiving, via a linear interferometer array, an RF signal, receiving, from the linear interferometer array, at least two differences in electrical phase of the RF signal between at least three antenna elements of the linear interferometer array, determining, via a closed form algorithm, a first integer solution based on the at least two differences in electrical phase, determining a plurality of adjacent integer solutions based at least in part on the first integer solution, each of the plurality of adjacent integer solutions having in common at least one variable, determining a plurality of extended phase solutions based on one of the plurality of adjacent integer solutions and the at least two differences in electrical phase, scaling the plurality of extended phase solutions based on a frequency of the RF signal, the scaling resulting in a plurality of scaled solutions, determining a plurality of deviations associated with each of the plurality of scaled solutions from at least one of the at least two differences in electrical phase, determining a minimum deviation from the plurality of deviations associated with each of the plurality of scaled solutions, selecting one of the plurality of scaled solutions with the minimum deviation as an output DF, displaying the output DF to an operator on a display, and configuring and transmitting the output DF for further use by high level processing or control processor.

A further embodiment of the present invention is directed to a computer readable medium storing non-transitory computer readable program code embodied therein for determining a direction finding (DF) to a received radio frequency (RF) signal, the non-transitory computer readable code comprising instructions which, when executed by a processor, perform the steps of: receiving, via a linear interferometer array, an RF signal, receiving, from the linear interferometer array, at least two differences in electrical phase of the RF signal between at least three antenna elements of the linear interferometer array, determining, via a closed form algorithm, a first integer solution based on the at least two differences in electrical phase determining, a plurality of adjacent integer solutions based at least in part on the first integer solution, each of the plurality of adjacent integer solutions having in common at least one variable, determining a plurality of extended phase solutions based on one of the plurality of adjacent integer solutions and the at least two differences in electrical phase, scaling the plurality of extended phase solutions based on a frequency of the RF signal, the scaling resulting in a plurality of scaled solutions, determining a plurality of deviations associated with each of the plurality of scaled solutions from at least one of the at least two differences in electrical phase, determining a minimum deviation from the plurality of deviations associated with each of the plurality of scaled solutions, selecting one of the plurality of scaled solutions with the minimum deviation as an output DF, displaying the output DF to an operator on a display, and configuring and transmitting the output DF to an automated analysis or control processor.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 6 is a flowchart of a preferred embodiment of a system of operation of the invention shown in FIG. 3.

DETAILED DESCRIPTION OF THE INVENTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Closed Form Method

Figure 1:
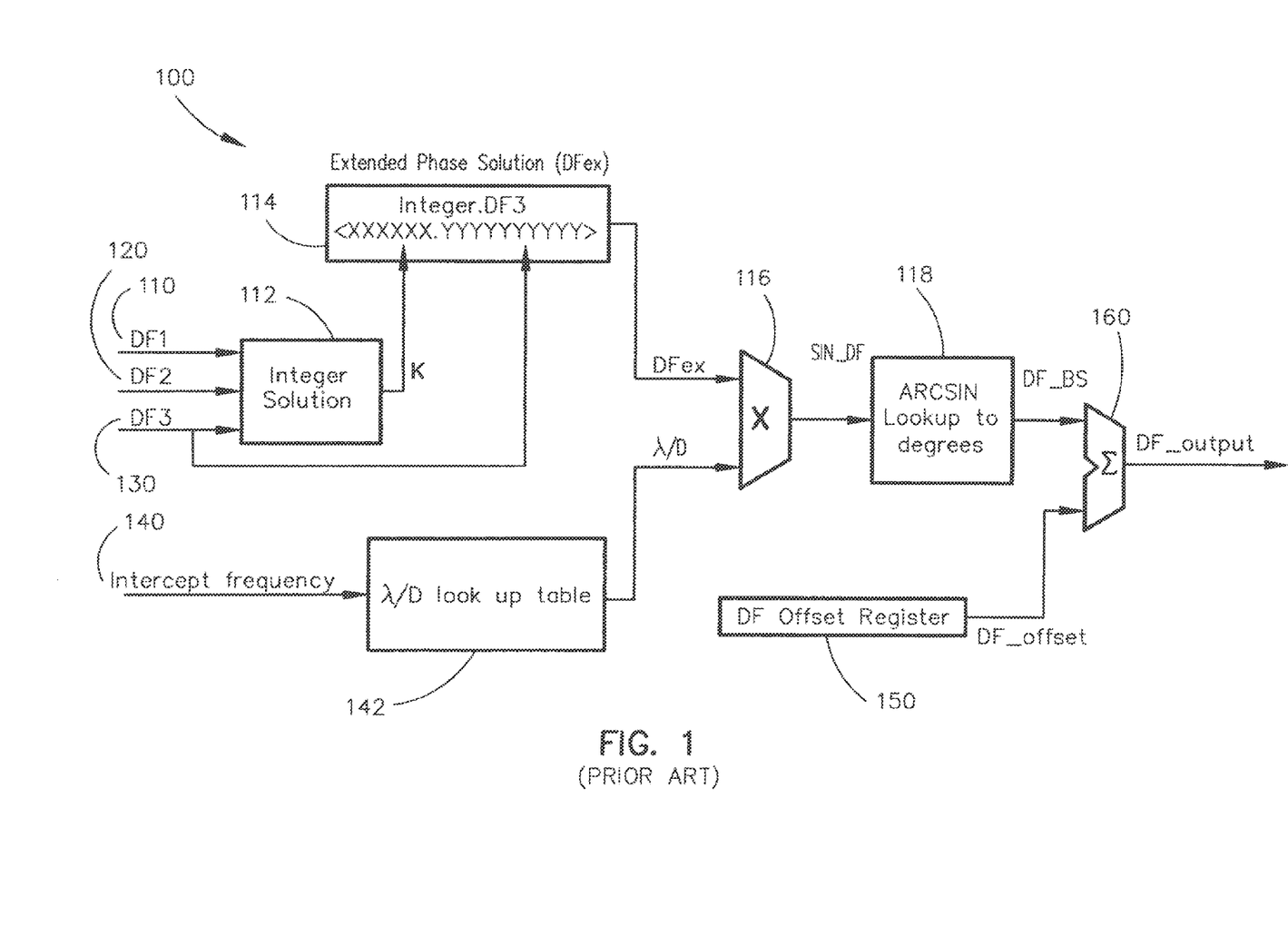
FIG. 1 is a block diagram of a prior art solution of a closed form method of DF analysis as background to the disclosure of the present invention.

Referring to FIG. 1, a block diagram of one prior art solution of a closed form method 100 of DF analysis is shown as background to the disclosure of the present invention. A closed form analysis may comprise an algebraic determination of an integer count of the phase revolution across the long baseline of a linear interferometer antenna array to determine a specific DF solution. Inputs to the method 100 may include DF1 110, DF2 120, DF3 130, an intercept frequency 140 and a DF offset 150. DF1, DF2, and DF3 may be defined as measured phase differences, in the range of 0 to 360 degrees, of the received RF signal as received by the antenna array. As an example, DF1 110 may be an electrical phase measurement between a first antenna element of the array to receive the signal and a second antenna element of the array to receive the signal. In the same example, a DF2 120 value may be an electrical phase measurement between the second antenna element of the array to receive the signal and a third antenna element of the array to receive the signal. DF3 130 being an electrical phase measurement between the first antenna element of the array to receive the signal and a last antenna element of the array to receive the signal.

It is further contemplated the values for DF1, DF2, and DF3 may further be variable between a plurality of antenna elements of the array. For example, DF1 may be implemented as an electrical phase measurement between a second antenna element and a fourth antenna element to receive the signal. DF2 may be implemented as a difference between a first and a third antenna. Electrical Phase measurements used by embodiments of the present invention are not limited to a specific antenna element numerical order or sequence.

A closed form analysis may include determining 112 an integer solution K from the three inputs DF1 110, DF2 120, and DF3 130. The integer solution K may be defined as representing the integer number of 360 degree phase intervals in the phase difference between the first antenna and the last antenna of the array to receive the RF signal. The algorithm to determine the integer solution K is specific to the spacings of the individual antennas of the array. The closed form analysis 100 may continue to include determining 114 an extended phase solution DFex. DFex may comprise the integer solution K on the left side of the decimal combined with the DF3 value 130 on the right of the decimal.

Method 100 may receive the intercept frequency 140. Intercept frequency 140 may then be used by a well-known λ/D lookup table at step 142 to determine a λ/D value. D may be defined herein as the baseline length of first to last antenna element of the array.

Method 100 then may scale the combined DFex and λ/D at step 116 based on frequency and baseline length to output a SIN_DF value. Step 118 may use an arcsin lookup to output a number of degrees of the DF_BS. The result is a DF solution in mechanical degrees where BS may be defined as the bore sight of the array. Method 100 may receive input from the aircraft 150 to adjust the relative output to an actual bearing. Step 160 may receive input from the DF_offset as the heading of the aircraft 150 in combination with the relative DF_BS solution to determine a DF_output as a bearing to the emitter.

Hybrid Method

Figure 2:
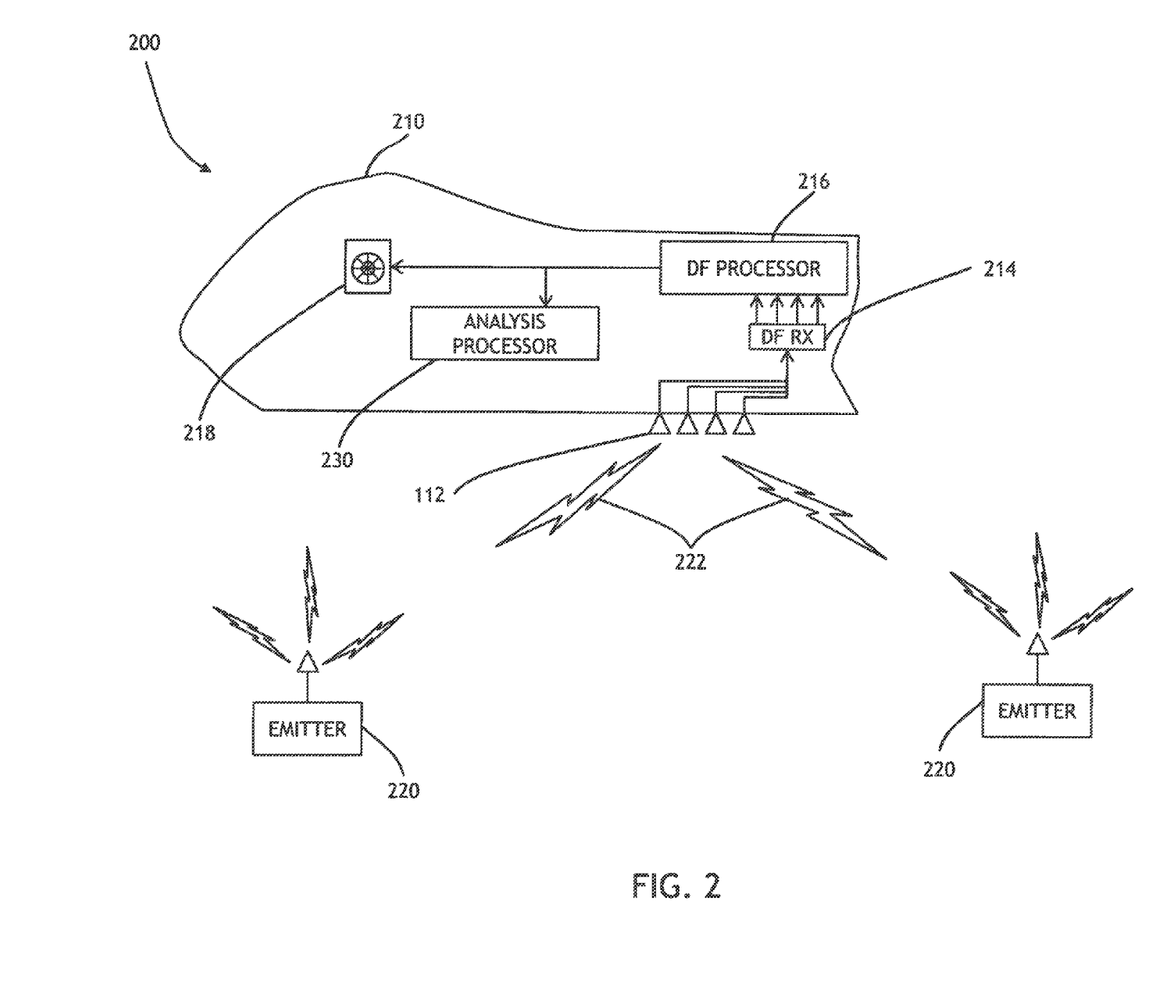
FIG. 2 is an overview of an operational system of a preferred embodiment of the present invention configured for use on an aircraft.

Referring to FIG. 2, an overview of a preferred embodiment of the present invention configured for use on an aircraft is shown. (Similar configurations may be applicable to ship based, ground based and satellite based systems. An aircraft based system is shown as an example.) Preferably, aircraft 210 may be configured with linear interferometer array 212. Method 200 may function with a linear interferometer array configured with 3 or more antenna elements 212. RF signals may be transmitted by emitter 220 such that signals may propagate in a plurality of directions. RF signals 222 may be received by each element of linear interferometer array 112. Linear interferometer array 112 may transmit phase measurements and frequency information to direction finding receiver DF RX 214 for analysis. The phase measurements sent from antenna to DF RX may be between a plurality of antenna elements in a plurality of orders. DF processor 216 may receive information from DF RX and process the signals in accordance with the present invention. DF processor 216 may transmit information to a display 218 readable by a crew member or to an automated analysis or control processor 230.

Figure 3:
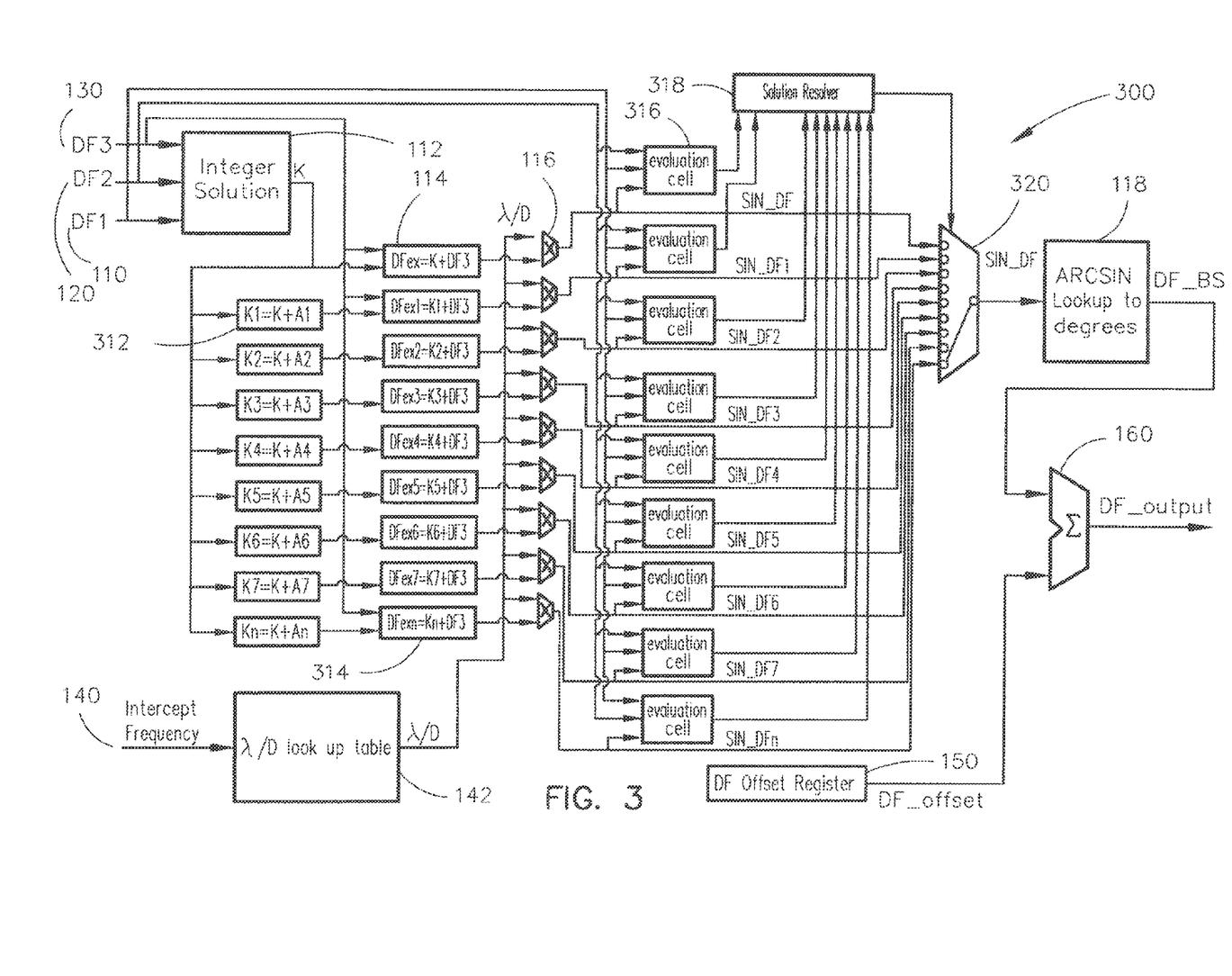
FIG. 3 is a block diagram of a hybrid method of DF analysis in accordance with a preferred embodiment of the present invention.

Referring to FIG. 3, a block diagram of a hybrid method 300 of DF analysis in accordance with a preferred embodiment of the present invention is shown. The hybrid method 300 may determine an accurate yet efficient result using all baselines and at reduced SNR. A closed form portion of method 300 may provide the initial solution while a hybrid portion may build on and refine the closed form solution revealing SNR advantages while requiring only a fraction of the computational operations.

Hybrid Overview

In a preferred embodiment of the present invention, the hybrid method 300 may take advantage of efficiencies found in the closed form method combined with efficiencies inherent to the estimation method. The hybrid method may calculate a first integer solution via the closed form method and from the first integer solution determine a plurality of adjacent integer solutions. The hybrid method may then evaluate the closed form solution and the plurality of adjacent solutions using the estimation method to determine which of these solutions best fits the phase measurements. Invalid solutions are discarded in the process.

Hybrid Specifics

Through numerical analysis and simulation it has been determined that a fixed integer relationship may exist between 1) a closed form integer solution and 2) a plurality of adjacent solutions slightly offset in input phase value from the closed form integer solution. This relationship may be of specific value in determining an accurate DF in situations of low SNR and high phase measurement error. The number of adjacent solutions may be directly proportional to the baseline measurement of the antenna array and independent of RF signal intercept angle.

For example, a standard baseline array using a closed form algorithm to determine an integer solution K may result in a single specific value for K. At low SNR levels, this single K value from the closed form method may be highly inaccurate or invalid. A hybrid method may calculate a plurality of adjacent values to K where a variable (A1 through An) is added to K to determine the adjacent values (K1 through Kn). The hybrid method 300 may then analyze the plurality of integer solutions to determine which of the solutions would fit within a result found using measured DF1 and DF2 values. The solution with the smallest error from that which should have been found from the measured results is output as the accurate DF solution.

Preferably, for a standard DF algorithm there are n integer solutions (Kn) adjacent to the closed form integer solution K. Through error analysis and simulation, these n adjacent solutions comprise a repetitive pattern of viable solutions distinct yet related to the closed form solution. Further, it is possible to analyze these n solutions to determine which of the Kn solutions may best fit a result compared to measured values DF1 and DF 2.

Preferred inputs to method 300 may include DF1 110, DF2 120, and DF3 130, intercept frequency 140, and DF offset register 150 similar to the closed form method of FIG. 1. DF1 110 may be defined as a difference in electrical phase between a first antenna element to receive an RF signal and a second antenna element to receive the signal. DF2 120 may be defined as a difference in electrical phase between a second antenna element to receive the RF signal and a third antenna element to receive the signal. DF3 130 may be defined as a difference in electrical phase measured between a first antenna element to receive the RF signal and a last antenna element to receive the signal. Inputs DF1, DF2 and DF3 are variables included in integer solution algorithm 112 to determine integer solution K. From integer solution K the n adjacent solutions K1 through Kn are determined at step 312 by adding fixed integers (offset values) A1 through An to K respectively. A1 through An values may be derived via analysis and simulation.

To determine offset values A1 through An, simulations were performed and analysis revealed consistent results. Through the simulations, errors were induced to the DF1, DF2 and DF3 values to compile resulting DF values based on the erroneous inputs. Of the resulting possible values of K, the errors were consistently grouped in one of n offsets from the integer solution K generated by the closed form algorithm. The consistency of the error values may be independent of the frequency 140 or angle of the incoming RF signal. Returning to the error induced values for DF1 through DF3, and assuming that the closed form K value is wrong, the correct K value may be very likely to be one of the n offsets from the closed form K value. Additionally, longer than standard baseline analysis has proven an equally proportional number of n offsets from K, the number of possible fixed integers directly proportional to the length of the baseline. These n offsets may be referred to as A1 through An.

Preferably, Step 312 may generate a plurality of adjacent integer solutions (K1 through Kn) through the addition of the n offsets (A1 through An) to the closed form or first integer solution K. The result of step 312 may include a plurality of adjacent integer solutions K1 through Kn. These "offset K" values (K1 through Kn) may then be added to the original DF3 value at step 314 to determine an extended phase solution for the original K as well as a plurality of extended phase solutions. The result of step 314 may include DFex through DFexn.

Method 300 may receive an intercept frequency 140 and transmit the frequency to a λ/D lookup table at step 142. A result of step 142 may include a λ/D value based on the frequency of the wavelength (λ) and the long baseline spacing found in the antenna array (D). Step 116 may receive the λ/D value as well as each of the n+1 DFex values and scale the DFex value by the λ/D to determine a resultant SIN_DF through SIN_DFn value.

Method 300 may then preferably transmit the n+1 SIN_DF values to evaluation cell 316 and to selector 320. Evaluation cell 316 may receive three inputs for analysis: 1) scaled DFexn from scaling step 116, and 2) measured DF1 110 and 3) DF2 120 values from the interferometer array. Evaluation step 316 may operate by analyzing the SIN_DFn value and calculating a scaled solution first phase estimate DF1 and a scaled solution second phase estimate DF2 value based on the SIN_DFn value. Method 300 may then compare the anticipated DF1 value to the measured DF1 110 to determine a DF1 difference. Method 300 additionally compares the anticipated DF2 value to the measured DF2 120 to determine a DF2 difference. Method 300 may then preferably use a well-known root mean square analysis to determine a DFd(sum) value. Alternatively, it is contemplated Method 300 may add the two differences to determine a summed difference DFd (sum). For example, if a measured DF1 value 110 may be indicated as DF1m and a measured DF2 value 120 may be indicated by DF2m thus: DFd(sum)=(DF1s−DF1m)+(DF2s−DF2m).

Evaluation cell 316 may transmit the DFd(sum) value to solution resolver 318. Additionally, evaluation cell 316 may determine which of the SIN_DFn values may be outside a range of plus or minus 1. Should a SIN_DFn value be outside the range, evaluation cell may block the solution from being available to selector 320. For example, evaluation cell may add a false difference to DFd(sum) to SIN_DFn values creating a situation where solution resolver 318 will positively not select the input with the high false difference.

In a preferred embodiment, solution resolver 318 receives DFd(sum) input from evaluation cell 316. Solution resolver may determine the least of the DFd(sum) differences. Each of the n offset values are evaluated, including the result from DFex with no offset applied to K, based on the same minimum value criteria. The DFd(sum) value with the least difference is allowed to proceed through selector 320 as the SIN_DF value. Solution resolver may "drive" selector 320 to a position to allow the chosen value to proceed.

Method 300 may then use an ARCSIN lookup to determine a number of mechanical degrees RF signal is offset from the boresight of the array (DF_BS). Method 300 may then use aircraft heading as a DF_offset 150 to determine at step 160 an actual true or magnetic bearing in degrees from the antenna array to the emitter (DF_output).

Figure 4:
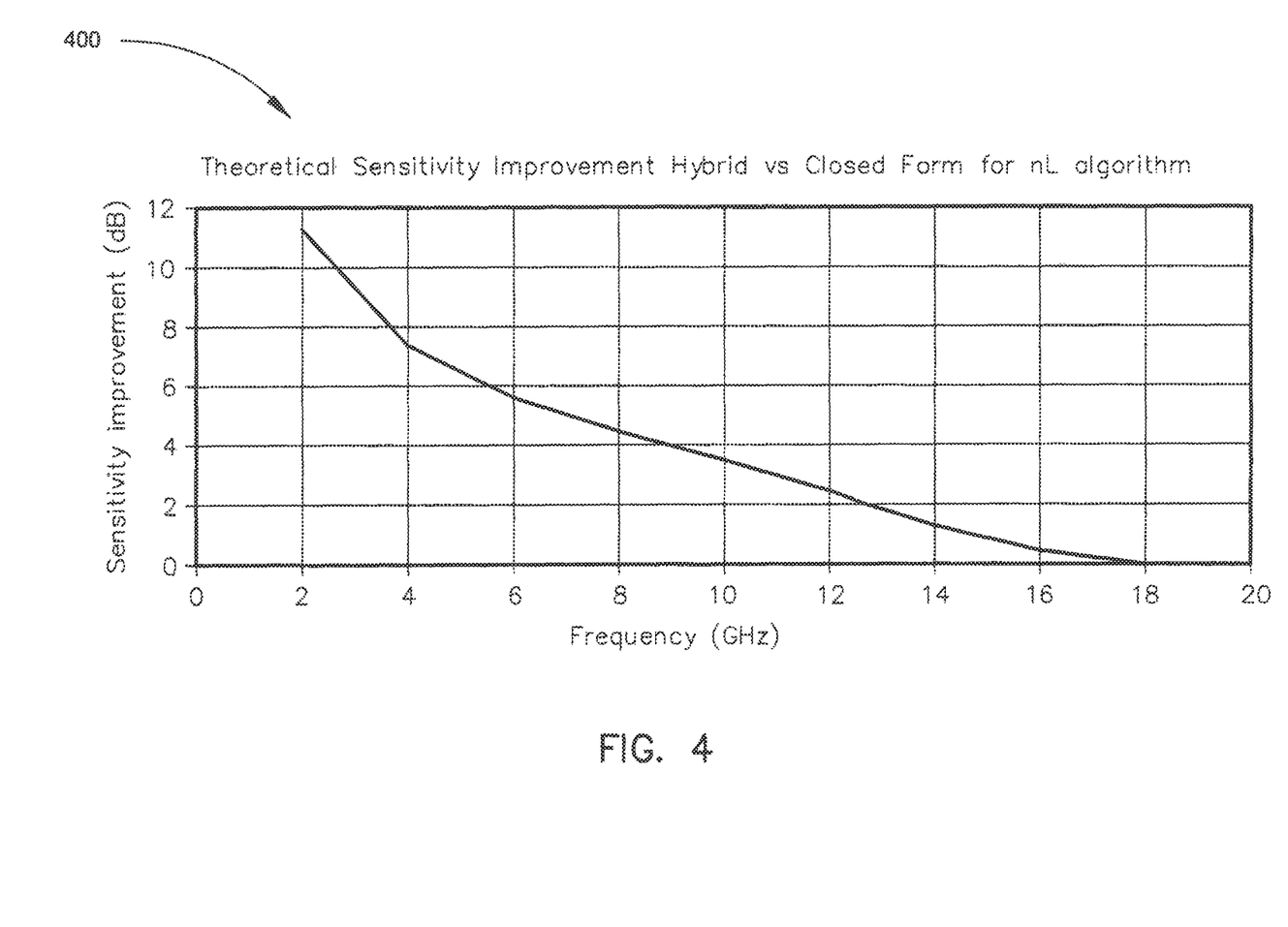
FIG. 4 is a graph depicting an estimated improvement in theoretical sensitivity using a hybrid method in accordance with a preferred embodiment of the present invention.

Referring to FIG. 4, a graph depicting an estimated improvement in theoretical sensitivity using a hybrid method in accordance with a preferred embodiment of the present invention is shown. A probable increase in sensitivity may result in use of the hybrid algorithm over use of a standard algorithm. As shown, an improvement of 11 dB may be found at a reception frequency of 2 GHz while an improvement of between 3 and 4 dB may be found at 10 GHz.

Simulation of the hybrid algorithm vs. the standard algorithm may indicate significant improvement at low frequency providing useable DF solutions at significantly lower SNR. This data was generated from a simulation using a noise model of phase measurement error=$1/(SNR)^{0.5}$. The simulation assumed that there were no other limitations to system sensitivity. System sensitivity of both the closed form and the hybrid methods was assessed as the SNR level where no more that 10% of processed signals generated an ambiguous or invalid DF solution. Under operational conditions, the improvement in sensitivity may be affected by other factors which may directly affect SNR; such as minimum SNR for signal detection and measurement accuracy requirement of other parameters.

Although a standard frequency range of 2 to 18 GHz may be indicated in FIG. 4, it is contemplated that the present invention hybrid method and system may be applicable to frequencies of any range and antenna baselines of any measurement. A standard baseline may be used herein as a preferred embodiment while increased baselines of any length may be directly applicable to the present invention and are contemplated within this disclosure.

Figure 5:
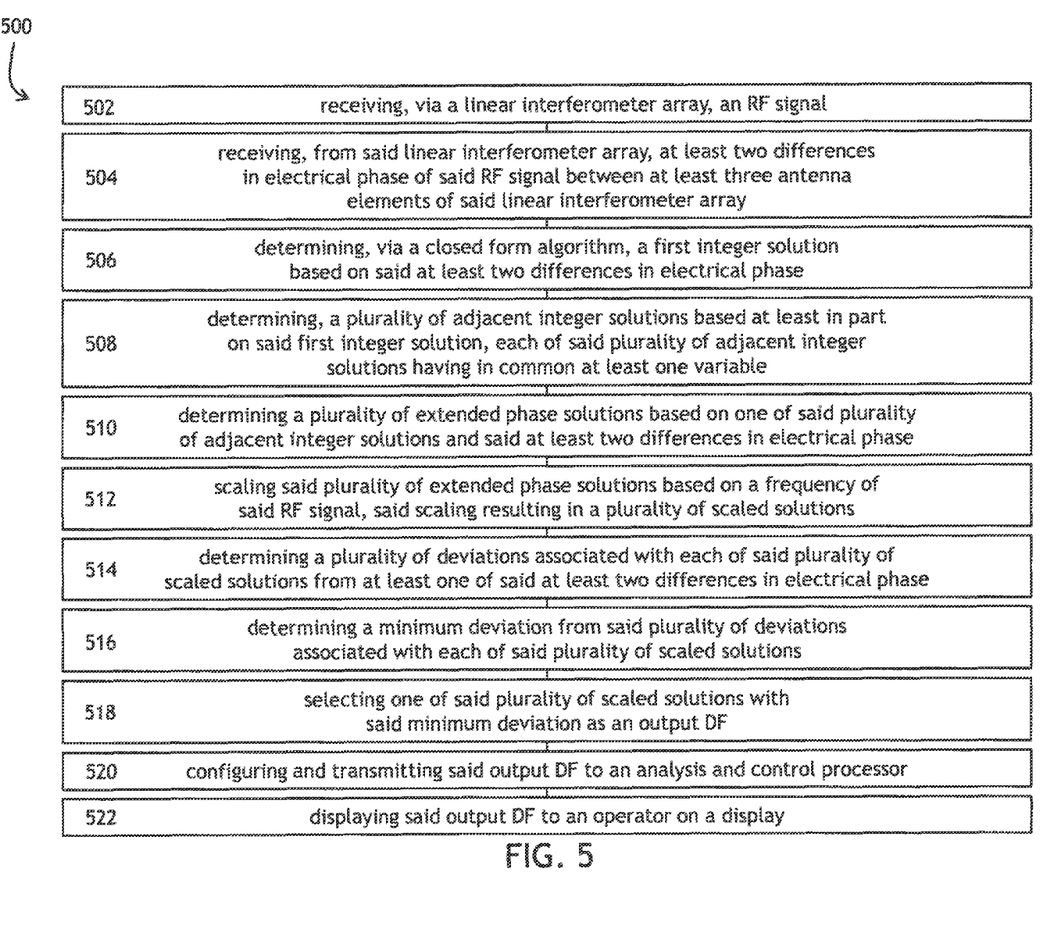
FIG. 5 is a flowchart of a preferred embodiment of a method of operation of the invention shown in FIG. 3.

Referring to FIG. 5, a flowchart of a preferred embodiment of a method of operation of the invention shown in FIG. 3 is shown. Method 500 may comprise, at step 502, a method for determining a direction finding (DF) to a received radio frequency (RF) signal may comprise: receiving, via a linear interferometer array, an RF signal, at step 504, receiving, from the linear interferometer array, at least two differences in electrical phase of the RF signal between at least three antenna elements of the linear interferometer array, at step 506, determining, via a closed form algorithm, a first integer solution based on the at least two differences in electrical phase, at step 508, determining, a plurality of adjacent integer solutions based at least in part on the first integer solution, each of the plurality of adjacent integer solutions having in common at least one variable, at step 510, determining a plurality of extended phase solutions based on one of the plurality of adjacent integer solutions and the at least two differences in electrical phase, at step 512, scaling the plurality of extended phase solutions based on a frequency of the RF signal, the scaling resulting in a plurality of scaled solutions, at step 514, determining a plurality of deviations associated with each of the plurality of scaled solutions from at least one of the at least two differences in electrical phase, at step 516, determining a minimum deviation from the plurality of deviations associated with each of the plurality of scaled solutions, at step 518, selecting one of the plurality of scaled solutions with the minimum deviation as an output DF. At step 520, Method 500 may configure output DF for transmission to and use by a analysis or control processor, and at step 522, Method 500 may display the output DF to an operator on a display.

Referring to FIG. 6, a flowchart of a preferred embodiment of a system of operation of the invention shown in FIG. 3 is shown. System 600 may comprise, at step 602 a computer readable medium storing non-transitory computer readable program code embodied therein for determining a direction finding (DF) to a received radio frequency (RF) signal, the non-transitory computer readable code comprising instructions which, when executed by a processor, perform: at step 604, receiving, via a linear interferometer array, an RF signal, at step 606, receiving, from the linear interferometer array, at least two differences in electrical phase of the RF signal between at least three antenna elements of the linear interferometer array, at step 608, determining, via a closed form algorithm, a first integer solution based on the at least two differences in electrical phase, at step 610, determining, a plurality of adjacent integer solutions based at least in part on the first integer solution, each of the plurality of adjacent integer solutions having in common at least one variable, at step 612, determining a plurality of extended phase solutions based on one of the plurality of adjacent integer solutions and the at least two differences in electrical phase, at step 614, scaling the plurality of extended phase solutions based on a frequency of the RF signal, the scaling resulting in a plurality of scaled solutions, at step 616, determining a plurality of deviations associated with each of the plurality of scaled solutions from at least one of the at least two differences in electrical phase, at step 618, determining a minimum deviation from the plurality of deviations associated with each of the plurality of scaled solutions, at step 620, selecting one of the plurality of scaled solutions with the minimum deviation as an output DF, and at step 622, the DF solution may be configured to be transmitted to and used by an additional computing system for the purpose of high level processing or control. For example, multiple DF solutions to an RF emitter may be recorded from a moving aircraft to calculate a geolocation of the RF emitter. In a similar manner DF solutions from multiple aircraft may be used to calculate a geo-location of the RF emitter. Additionally, the use of a DF solution may enable slew of a narrow field of view camera toward the determined location of the RF emitter. Finally, at step 624, Method 600 may display output DF to an operator on a display.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the method and system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for determining a direction finding (DF) to a received radio frequency (RF) signal, the method comprising:
   receiving, via a linear interferometer array, an RF signal;
   receiving, from said linear interferometer array, at least two differences in electrical phase of said RF signal between at least three antenna elements of said linear interferometer array;
   determining, via a closed form algorithm, a first integer solution based on said at least two differences in electrical phase;
   determining, a plurality of adjacent integer solutions based at least in part on said first integer solution, each of said plurality of adjacent integer solutions having in common at least one variable;
   determining a plurality of extended phase solutions based on one of said plurality of adjacent integer solutions and said at least two differences in electrical phase;
   scaling said plurality of extended phase solutions based on a frequency of said RF signal, said scaling resulting in a plurality of scaled solutions;
   determining a plurality of deviations associated with each of said plurality of scaled solutions from at least one of said at least two differences in electrical phase;
   determining a minimum deviation from said plurality of deviations associated with each of said plurality of scaled solutions;
   selecting one of said plurality of scaled solutions with said minimum deviation as an output DE;
   configuring and transmitting said output DF to an analysis and control processor; and
   displaying said output DF to an operator on a display.

2. The method of claim 1, wherein said receiving, from said linear interferometer array, at least two differences in electrical phase further comprises receiving a first phase difference, receiving a second phase difference, and receiving a long baseline phase difference.

3. The method of claim 1, wherein said plurality of adjacent integer solutions are related to said first integer solution by a plurality of fixed integers, said plurality of fixed integers offset a fixed distance from said first integer solution.

4. The method of claim 3, wherein said plurality of fixed integers are independent of a frequency and an intercept angle of said received RF signal.

5. The method of claim 1, wherein determining a plurality of extended phase solutions is further based in part on said long baseline phase difference.

6. The method of claim 1, wherein said plurality of fixed integers are further related by input phase values.

7. The method of claim 1, wherein said determining said plurality of extended phase solutions based on one of said plurality of adjacent integer solutions and said at least two differences in electrical phase further comprises use of said long baseline extended phase measurement.

8. The method of claim 1, wherein said scaling said plurality of extended phase solutions based on a frequency of said RF signal further comprises scaling based on a wavelength frequency and said long baseline extended phase measurement.

9. The method of claim 1, wherein said determining a minimum deviation further comprises a root mean square analysis of a combined difference for each of said plurality of scaled solutions, said combined difference based on at least: 1) a DF1 difference between said first phase difference and a scaled solution first phase estimate, and 2) a DF2 difference between said second phase difference and a scaled solution second phase estimate, and 3) a DFn difference between at least one additional phase difference and at least one additional scaled solution phase estimate.

10. The method of claim 1, wherein selecting one of said plurality of scaled solutions with said minimum deviation as an output DF further comprises removing from consideration a scaled solution from said plurality of scaled solutions whose value is outside a range of plus 1.0 to minus 1.0.

11. A computer readable medium storing non-transitory computer readable program code embodied therein for determining a direction finding (DF) to a received radio frequency (RF) signal, the non-transitory computer readable code comprising instructions which, when executed by a processor, perform the steps of:

receiving, via a linear interferometer array, an RF signal;

receiving, from said linear interferometer array, at least two differences in electrical phase of said RF signal between at least three antenna elements of said linear interferometer array;

determining, via a closed form algorithm, a first integer solution based on said at least two differences in electrical phase;

determining, a plurality of adjacent integer solutions based at least in part on said first integer solution, each of said plurality of adjacent integer solutions having in common at least one variable;

determining a plurality of extended phase solutions based on one of said plurality of adjacent integer solutions and said at least two differences in electrical phase;

scaling said plurality of extended phase solutions based on a frequency of said RF signal, said scaling resulting in a plurality of scaled solutions;

determining a plurality of deviations associated with each of said plurality of scaled solutions from at least one of said at least two differences in electrical phase;

determining a minimum deviation from said plurality of deviations associated with each of said plurality of scaled solutions;

selecting one of said plurality of scaled solutions with said minimum deviation as an output DE;

configuring and transmitting said output DF to an analysis and control processor; and displaying said output DF to an operator on a display.

12. The method of claim 11, wherein said receiving, from said linear interferometer array, at least two differences in electrical phase further comprises receiving a first phase difference, receiving a second phase difference, and receiving a long baseline phase difference.

13. The method of claim 11, wherein said plurality of adjacent integer solutions are related to said first integer solution by a plurality of fixed integers, said plurality of fixed integers offset a fixed distance from said first integer solution.

14. The method of claim 13, wherein said plurality of fixed integers are independent of a frequency and an intercept angle of said received RF signal.

15. The method of claim 11, wherein determining a plurality of extended phase solutions is further based in part on said long baseline phase difference.

16. The method of claim 11, wherein said plurality of fixed integers are further related by input phase values.

17. The method of claim 11, wherein said determining said plurality of extended phase solutions based on one of said plurality of adjacent integer solutions and said at least two differences in electrical phase further comprises use of said long baseline extended phase measurement.

18. The method of claim 11, wherein said scaling said plurality of extended phase solutions based on a frequency of said RF signal further comprises scaling based on a wavelength frequency and said long baseline extended phase measurement.

19. The method of claim 11, wherein said determining a minimum deviation further comprises a root mean square analysis of a combined difference for each of said plurality of scaled solutions, the combined difference based on 1) a DF1 difference between said first phase difference and a scaled solution first phase estimate, and 2) a DF2 difference between said second phase difference and a scaled solution second phase estimate, and 3) a DFn difference between at least one additional phase difference and at least one additional scaled solution phase estimate.

20. The method of claim 11, wherein selecting one of said plurality of scaled solutions with said minimum deviation as an output DF further comprises removing from consideration a scaled solution from said plurality of scaled solutions whose value is outside a range of plus 1.0 to minus 1.0.

* * * * *